United States Patent
Cayzac

(10) Patent No.: US 8,690,161 B2
(45) Date of Patent: Apr. 8, 2014

(54) DEVICE FOR THE SEALED RETENTION OF A PIPE, METHOD FOR THE SEALED MOUNTING OF A PIPE THROUGH A PARTITION WALL AND USE OF SUCH A DEVICE FOR THE SEALED PENETRATION OF A PARTITION WALL OF AN AIRCRAFT TANK

(75) Inventor: Gaspard Cayzac, Margut (FR)

(73) Assignee: Ampherol Air LB, Blagny (FR)

( * ) Notice: Subject to any disclaimer, the term of this patent is extended or adjusted under 35 U.S.C. 154(b) by 190 days.

(21) Appl. No.: 12/575,993

(22) Filed: Oct. 8, 2009

(65) Prior Publication Data

US 2010/0109259 A1  May 6, 2010

(30) Foreign Application Priority Data

Oct. 13, 2008  (FR) ...................................... 08 56921

(51) Int. Cl.
| | |
|---|---|
| F16L 5/02 | (2006.01) |
| H02G 3/22 | (2006.01) |
| H02G 15/04 | (2006.01) |
| F16L 21/02 | (2006.01) |
| H02G 15/013 | (2006.01) |
| F16L 17/00 | (2006.01) |
| H02G 3/18 | (2006.01) |

(52) U.S. Cl.
USPC ............ 277/606; 277/616; 277/626; 174/650

(58) Field of Classification Search
USPC ......... 277/551, 554, 628, 606, 616, 626, 627; 16/2.1, 2.2; 174/65, 153
See application file for complete search history.

(56) References Cited

U.S. PATENT DOCUMENTS

| 2,234,441 | A | * | 3/1941 | Ludwig ..................... 174/153 G |
| 2,816,950 | A | * | 12/1957 | Kruss et al. ............... 174/153 R |
| 3,243,240 | A | * | 3/1966 | Arthur ......................... 384/138 |
| 4,232,712 | A | * | 11/1980 | Squires ........................ 138/109 |
| 4,481,697 | A | * | 11/1984 | Bachle ......................... 24/135 R |
| 5,056,801 | A | | 10/1991 | Beadle et al. |
| 5,353,472 | A | * | 10/1994 | Benda et al. ..................... 16/2.2 |
| 5,553,869 | A | * | 9/1996 | Stamback ..................... 277/502 |
| 5,811,728 | A | * | 9/1998 | Maeda .......................... 174/652 |

(Continued)

FOREIGN PATENT DOCUMENTS

| EP | 1026044 | 8/2000 |
| FR | 2703753 | 10/1994 |
| FR | 2813370 | 5/2002 |

OTHER PUBLICATIONS

Search Report prepared for FR 0856921 on May 20, 2009.

*Primary Examiner* — Vishal Patel
*Assistant Examiner* — Nicholas L Foster
(74) *Attorney, Agent, or Firm* — Meyertons, Hood, Kivlin, Kowert & Goetzel, P.C.; Eric B. Meyertons

(57) ABSTRACT

This device for the sealed retention of a pipe for the sealed penetration of a partition wall by the pipe comprises a body equipped with a sealed axial passage for the pipe and with a peripheral region for the sealed mounting of the device in an orifice made in the partition wall. The body comprises a set of rigid retaining sectors each comprising a bearing shoe for the pipe, and a sealing material positioned between the sectors to delimit the said sealed passage, and around the said sectors in the said peripheral region of the body via which region it is mounted on the partition wall.

11 Claims, 5 Drawing Sheets

(56) References Cited

U.S. PATENT DOCUMENTS

| | | | |
|---|---|---|---|
| 5,870,799 A * | 2/1999 | Benda | 16/2.1 |
| 6,161,716 A * | 12/2000 | Oberhofer et al. | 220/203.04 |
| 7,261,306 B2 * | 8/2007 | Trotter | 280/124.106 |
| 7,455,192 B2 * | 11/2008 | Siragusa | 220/789 |
| 7,481,436 B2 * | 1/2009 | May et al. | 277/606 |
| 7,915,507 B2 * | 3/2011 | Onheiser | 84/421 |
| 2008/0116319 A1 | 5/2008 | Negley et al. | |
| 2010/0252572 A1 * | 10/2010 | Sendelbach | 222/105 |

\* cited by examiner

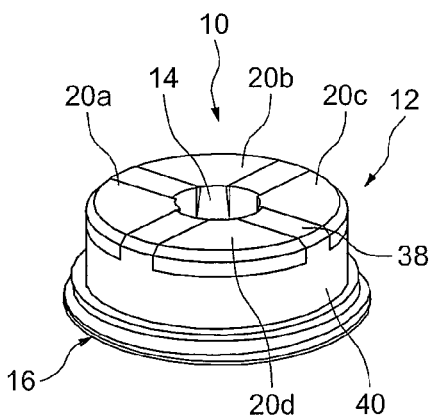
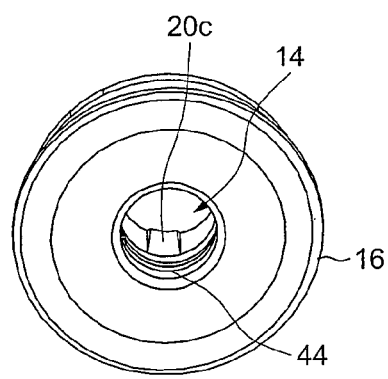
FIG.1    FIG.2
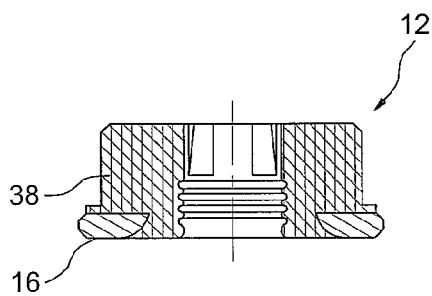
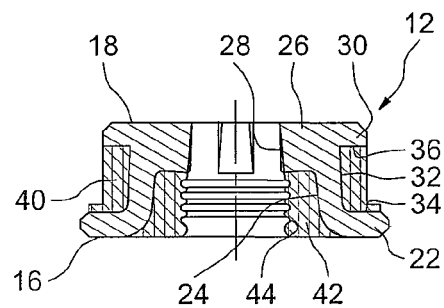
FIG.6    FIG.7
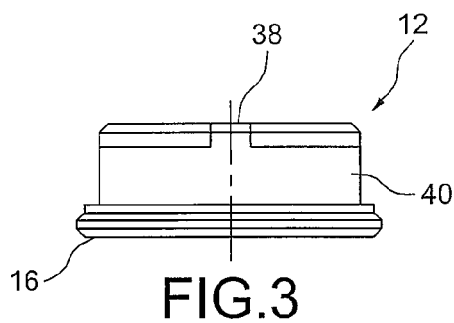
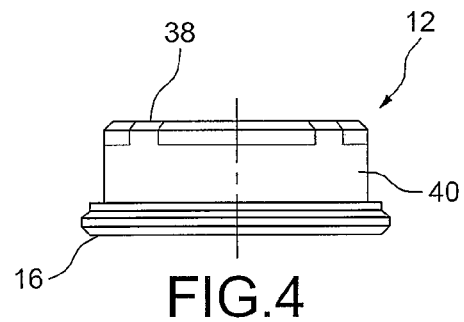
FIG.3    FIG.4
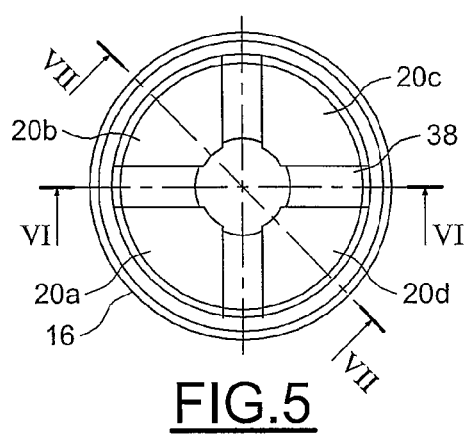
FIG.5

DEVICE FOR THE SEALED RETENTION OF A PIPE, METHOD FOR THE SEALED MOUNTING OF A PIPE THROUGH A PARTITION WALL AND USE OF SUCH A DEVICE FOR THE SEALED PENETRATION OF A PARTITION WALL OF AN AIRCRAFT TANK

BACKGROUND OF THE INVENTION 1. Field of the Invention

The invention deals in general with sealing devices and relates more specifically to the sealed mounting of a pipe through a partition wall.

One particular advantageous application of the invention is the sealed penetration of a feed pipe through the wall of a fuel tank for an aircraft, particularly an airplane kerosene tank. 2. Description of the Relevant Art As will be appreciated, introducing a pipe through a partition wall entails making an orifice in the partition wall and generally involves the use of a seal inserted in the orifice. Conventionally, the seal is made of an elastically deformable material and has an axial passage into which the pipe is introduced and an annular peripheral groove in which the edge of the orifice made in the partition wall is inserted.

The orifice is sized to ensure sufficient sealing between the pipe and the seal, as too is the annular groove which collaborates with the partition wall.

The assembly on the one hand seals the connection and, on the other hand, holds the pipe in place.

However, when the assembly is intended to be used in an environment in which the mechanical stresses are relatively high, forces applied to the pipe tend to cause the seal to deform causing this seal no longer to be able effectively to perform the required sealing function and possibly, in certain extreme cases, pulling out of the orifice.

A situation such as this is unacceptable in applications for which the pipe retention function and the sealing function have to be performed effectively even in the event of severe mechanical forces.

This is particularly the case in the field of aviation, particularly in the case of the sealed penetration of a partition wall of a kerosene tank.

SUMMARY OF THE INVENTION

It is therefore an object of the invention to alleviate the disadvantages associated with the use of conventional sealing devices and to propose a device for the sealed penetration of a partition wall by a pipe that is capable of retaining the pipe and of sealing the connection even in the event of strong mechanical forces.

In a first aspect, a subject of the invention is therefore a device for the sealed retention of a pipe for the sealed penetration of the pipe through a partition wall, comprising a body equipped with a sealed axial passage for the pipe and with a peripheral region for the sealed mounting of the device in an orifice made in the partition wall.

The body of the device comprises a set of rigid retaining sectors each comprising a bearing shoe for the pipe, and a sealing material positioned between the sectors to delimit the said sealed passage, and around the said sectors in the said peripheral region of the body via which region it is mounted on the partition wall.

Thus, thanks to the use of the rigid sectors, the pipe can be retained effectively in a fixed predetermined position and the device is given enough rigidity to prevent any appreciable deformations of the device that could be liable to impair its overall shape and therefore the sealing of the connection.

Furthermore, thanks to the use of the sealing material positioned between the sectors and around the latter, sealing is afforded both between the device and the pipe and between the device and the partition wall.

According to another feature of the invention, the sectors can move radially outwards as the pipe is inserted through the sealed passage, so as to force the peripheral region of the body against the partition wall counter to a forces exerted by the sealing material that forces the shoes to bear against the pipe.

In one embodiment the body comprises a core made of rigid material, comprising a base from which the said sectors extend.

For example, each sector comprises an external radial groove filled with the said sealing material, to that point on the said peripheral region of the body via which it is mounted on the partition wall.

Advantageously the sealing material comprises a set of coaxial and parallel ribs projecting into the sealed passage.

As far as the bearing shoes are concerned, these project radially into the passage.

For example, the device comprises four retaining sectors. In one embodiment, the rigid sectors are made of composite.

The sealing material, for its part, for example contains silicone.

In a second aspect, another subject of the invention is a method for the sealed mounting of a pipe through a partition wall by means of a sealed retention device as defined hereinabove.

This method comprises the steps of:
inserting the device in an orifice made in the partition wall; and
introducing the pipe into the sealed passage of the body in such a way as, on the one hand, to force the sectors and the sealing material surrounding the sectors against the partition wall and, on the other hand, to force the bearing shoes against the pipe.

In a third aspect, yet another subject of the invention is the use of a retaining device as defined hereinabove for the sealed penetration of a partition wall of an aircraft tank.

BRIEF DESCRIPTION OF THE DRAWINGS

Other objects, features and advantages of the invention will become apparent from reading the following description, given solely by way of nonlimiting example and made with reference to the attached drawings in which:

FIGS. 1 and 2 are perspective views of a device according to the invention;

FIGS. 3 and 4 are two side views of the device of FIGS. 1 and 2, in two different orientations;

FIG. 5 is a view from above of the device of FIGS. 1 to 4;

FIGS. 6 and 7 are views in section, on VI-VI and VII-VII respectively, of the device of FIG. 5;

DETAILED DESCRIPTION OF THE PREFERRED EMBODIMENTS

Figure 11:
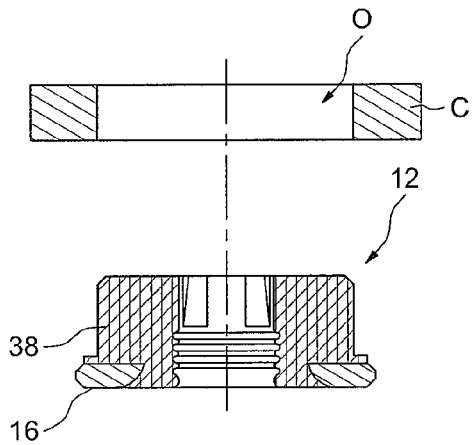
FIGS. 11 and 12 are views in section on XI-XI and XII-XII, respectively, of the device of FIG. 8.

FIGS. 1 to 4 depict a device for the sealed retention of a pipe according to the invention, denoted by the overall numerical reference 10.

In the intended application, this device is intended to retain and seal a feed pipe passing through a partition wall of a kerosene tank carried on board an airplane.

However, it would not constitute a departure from the scope of the invention if the device were intended for the sealed mounting of a pipe or pipeline through other types of partition wall.

As may be seen, the device 10 has an annular overall shape, here of circular cross section.

It essentially comprises a body 12 provided with an axial passage 14 for the sealed passage of the pipe and with an annular flange 16. When considering the direction in which the pipe is introduced into the passage 14, the body 12 comprises a proximal end facing towards the flange 16 and an opposite distal end, of planar shape.

As will be described in detail hereinafter, the body 12 is intended to be introduced into a corresponding shaped orifice made in the partition wall, bearing in a sealed manner against this wall via the annular flange 16.

The body 12 comprises a core 18 made of a rigid material that retains the pipe and gives the body enough rigidity to allow it to be subjected to mechanical forces without giving rise to any major deformation of the device.

For example, the core 18 is made of composite.

The core 18 comprises a set of retaining sectors 20-a, 20-b, 20-c, 20-d, in this instance four of these angularly distributed within the body 12.

Each sector extends from a common annular base 22 that forms the flange 16, and comprises a branch 24 that has a proximal first end extending from the base 22 and a distal end provided with a bearing shoe 26.

Each shoe 26 internally comprises a bearing surface 28 for the pipe, facing towards the. passage 14 and projecting thereinto and, externally, an annular shoulder 30 which, with the external peripheral surface 32 of the branch 24 and with a radial surface 34 of the base 22, delimits a peripheral groove 36.

As can be seen in FIGS. 6 and 7, the bearing shoes and, in particular, the bearing surfaces 28, are positioned facing one another in pairs so as to form a distal portion of the passage 14.

The retaining sectors will thus be designed in such a way that the passage delimited by the bearing surfaces 28 substantially corresponds to the external diameter of the pipe.

However, the diameter of the passage delimited by the shoe at the base of the shoes is slightly greater than that of the pipe, whereas the diameter of this passage at the distal end of the shoes is slightly smaller than that of the pipe.

Thus, and although the core 18 is made of a rigid material, thanks to the canterlevered arrangement of the bearing surfaces 28 with respect to the base 22, and in particular thanks to the presence of the branches 24, as the pipe is introduced, the retaining sectors 20a, 20b, 20c, 20d are liable to move radially outwards, through the deformation of the branches 24.

Figure 21:
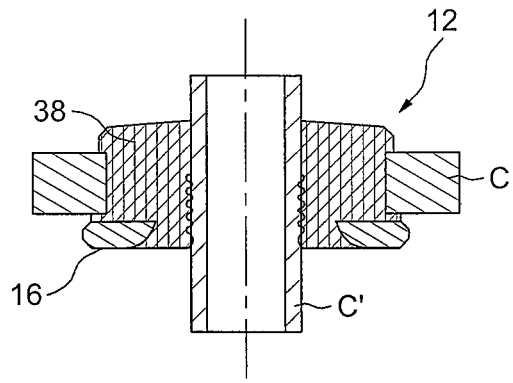
Figure 22:
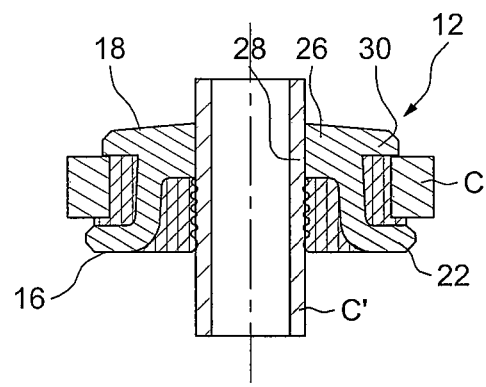
Figure 19:
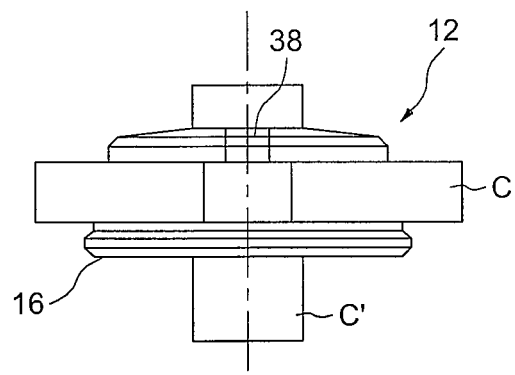
Figure 20:
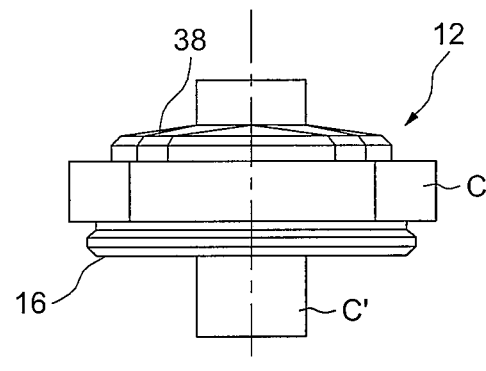

In other words, the bearing shoes are capable of adopting a first, rest, configuration visible in FIGS. 1 to 7 and an active position which they adopt after the pipe has been introduced into the passage 14 and which is visible in FIGS. 19 to 22.

As can be seen in FIGS. 6 and 7, the bearing surfaces 28 will be inclined so that they converge slightly towards the distal end of the passage 14, at an angle corresponding substantially to the angle of angular deformation of the retaining sectors as the pipe is introduced, so that following introduction, the bearing surfaces 28 will be parallel to the axis of the passage 14 which will therefore rest flat against the external peripheral surface of the pipe.

Moreover, as visible in FIGS. 1 to 4, the body 12 comprises a sealing material arranged between the retaining sectors 20-a, 20-b, 20-c and 20-d, on the inside and on the outside of the core 18.

In other words, between the retaining sectors, the body 12 has radial partition walls such as 38, which are elastically deformable.

The body 12 also comprises an external annular ring 40 made of sealing material surrounding the retaining sectors 20-a, 20-b, 20-c and 20-d.

In particular, the sealing material is arranged in the groove 36 to constitute a peripheral mounting region via which the body is mounted on the partition wall.

Internally, the body 12 comprises an internal sleeve 42 made of sealing material, internally bordering the branches 24 of the retaining sectors. As can be seen, this sleeve 42 is internally provided with a set of coaxial ribs, such as 44, and delimits, together with the bearing surfaces 28, the passage 14 for the pipe.

For example, the sealing material contains silicone.

However, any other elastically deformable material suited to the intended use could just as easily be used in place of the silicone.

The partition walls 38, the external band 40 and the internal sleeve 42 are formed in one piece simultaneously in one and the same molding operation.

Thus, for example, the core 18, including the retaining sectors 20-a, 20-b, 20-c, 20-d and the base 22 may be produced as a single piece by molding a rigid plastic, the sealing material then being overmolded onto the core 18 to create partition walls 38, the outer ring 40 and the inner sleeve 42.

As mentioned previously, the groove 36, covered with sealing material, is intended to constitute a region for mounting the device on the partition wall. The bearing shoes 26 are intended to retain the pipe in a predetermined fixed position through the partition wall, while the internal sleeve 42, provided with its annular ribs 44, is intended to provide sealing around the pipe.

The device which has just been described is used as follows.

Figure 12:
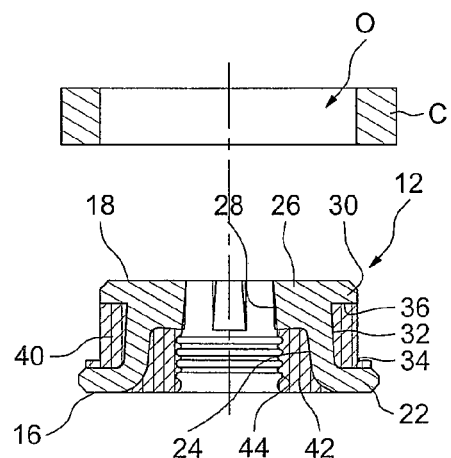
Figure 9:
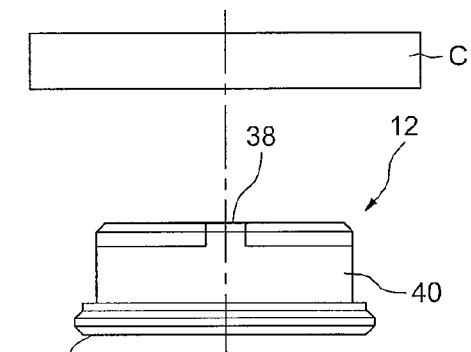
FIGS. 9 and 10 are side views of the device of FIG. 8, in respective orientations.
Figure 10:
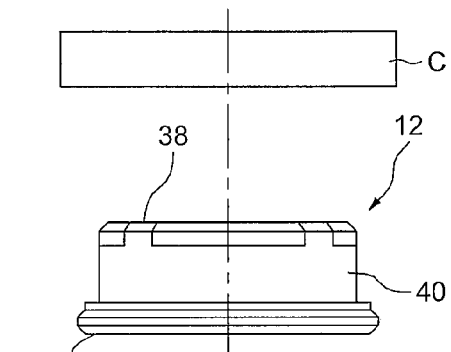
Figure 8:
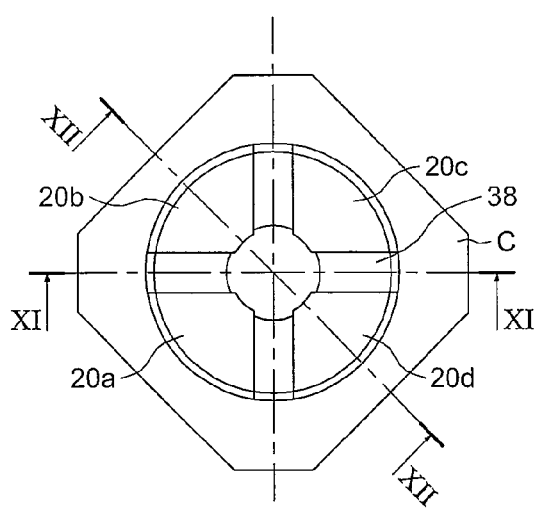
FIG. 8 is a view from above of the device showing how it is mounted on a partition wall.
Figure 15:
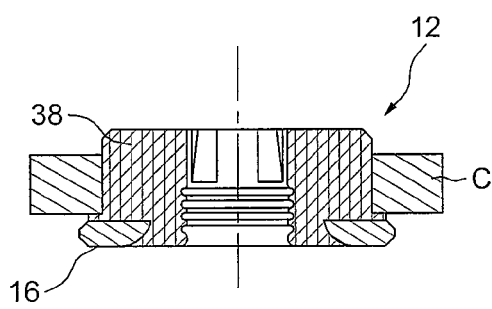
FIGS. 13 to 16 show the device after it has been mounted in an orifice made in the partition wall.
Figure 16:
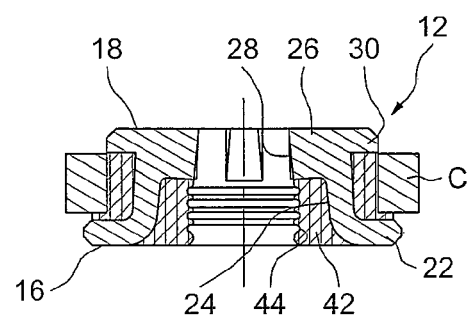
Figure 13:
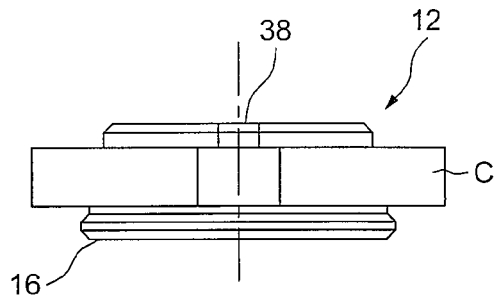
Figure 14:
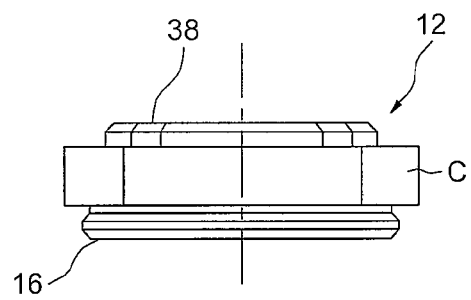

In a first step visible in FIGS. 9 to 16, the body 12 has first of all to be inserted into the orifice O made in the partition wall C. To do this, the body will be given dimensions substantially corresponding to those of the orifice O so that the body can be inserted in the orifice as a relatively tight fit. In this position, visible in FIGS. 13 to 16, the body bears via its flange 16 against the partition wall C with the interposition of sealing material. On the other side, it projects via its distal end. In this position, the retaining sectors are in the rest position mentioned previously.

Figure 17:
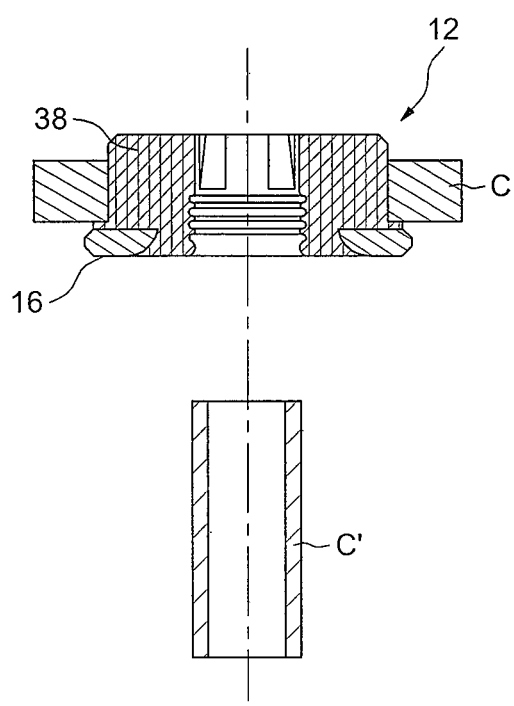
FIGS. 17 to 22 show the device of FIG. 1 after it has been mounted in the orifice made in the partition wall and after the pipe has been introduced.
Figure 18:
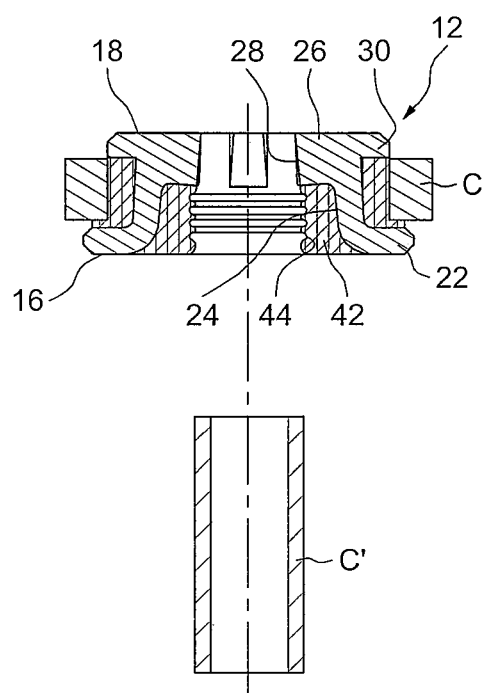

In the next step, illustrated in FIGS. 17 to 22, all that is required is for a pipe C' to be inserted through the passage 14. The pipe is inserted from the proximal end of the body 12.

As the pipe is being introduced, the retaining sectors are deformed from the rest position to the active position so that the bearing surfaces 28 rest flat against the external peripheral surface of the pipe C'.

Thanks to this radial deformation of the core, the sealing material with which the groove 36 is filled is pressed against the peripheral edge of the orifice in the partition wall, ensuring a perfect seal in this region.

Furthermore, during the deformation, the annular shoulder 30 of the shoes presses against the wall of the partition, thereby preventing any unwanted pulling-out of the device which remains retained against the wall by the flange 16 and by the shoulder 30.

Thanks to the arrangement which has just been described, the pipe is retained in an excellent manner while at the same time allowing it to move axially and providing excellent damping of vibrations and an excellent seal, even under strong mechanical forces, thanks to the retention of the device on the partition wall by the flange and by the shoulder, by the retention of the pipe by the bearing shoes forced against the pipe by the strip of sealing material with which the groove 36 is filled, and an excellent seal of the pipe, thanks to the inner sleeve 42 provided with its ribs 44.

It will also be noted that the retaining device that has just been described also provides electrical insulation between the pipe and the partition wall penetrated.

What is claimed is:

1. A device for the sealed retention of a pipe for the sealed penetration of the pipe through a partition wall, comprising a body equipped with a sealed axial passage for the pipe and equipped with a peripheral region for the sealed mounting of the device in an orifice made in the partition wall, wherein the body comprises a set of rigid retaining sectors each comprising a branch comprising an end provided with a bearing shoe for bearing directly against the pipe, and wherein a sealing material is positioned between the rigid retaining sectors to delimit the sealed axial passage and around the rigid retaining sectors to form an outer annular ring in the peripheral region of the body proximate the partition wall; and wherein the body comprises a core made of rigid material, comprising a base from which the rigid retaining sectors extend, wherein the base bears against the partition wall with the interposition of sealing material, wherein the bearing shoes and the base have a cantilevered arrangement, the body comprising an internal sleeve made of the sealing material, internally bordering the branches of the retaining sectors, the sealing material being overmolded onto the core to create the outer ring and the inner sleeve.

2. A device according to claim 1, wherein the rigid retaining sectors can move radially outwards as the pipe is inserted through the sealed axial passage, so as to force the peripheral region of the body against the partition wall counter to a force exerted by the sealing material that forces the bearing shoes to bear against the pipe.

3. A device according to claim 1, wherein each rigid retaining sector comprises an external radial groove filled with the sealing material at a point on the peripheral region proximate the partition wall.

4. A device according to claim 1, wherein the sealing material comprises a set of coaxial and parallel ribs projecting into the sealed axial passage.

5. A device according to claim 1, wherein the bearing shoes project radially into the sealed axial passage.

6. A device according to claim 1, wherein the device comprises four rigid retaining sectors.

7. A device according to claim 1, wherein the rigid retaining sectors are made of a composite material.

8. A device according to claim 1, wherein the sealing material contains silicone.

9. A device according to claim 1, further comprising a means of electrical insulation between the pipe and the partition wall.

10. A method for the sealed mounting of a pipe through a partition wall using a sealed retention device according to claim 1, comprising:

inserting the device in an orifice made in the partition wall; and introducing the pipe into the sealed passage of the body in such a way as, on the one hand, to force the rigid retaining sectors and the sealing material surrounding the rigid retaining sectors against the partition wall and, on the other hand, to force the bearing shoes against the pipe.

11. Use of the device according to claim 1 for the sealed penetration of a partition wall of an aircraft tank.

* * * * *